United States Patent [19]
Zhang et al.

[11] Patent Number: 5,944,776
[45] Date of Patent: *Aug. 31, 1999

[54] FAST CARRY-SUM FORM BOOTH ENCODER

[75] Inventors: Song Zhang, San Jose; Bassam J. Mohd, Sunnyvale, both of Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/720,118

[22] Filed: Sep. 27, 1996

[51] Int. Cl.⁶ .................................................. G06F 7/52
[52] U.S. Cl. .................................. 708/625; 708/629
[58] Field of Search .................... 364/746.2, 748.08, 364/748.09, 748.1, 750.5, 752, 753, 754.01, 757, 759, 760.01, 760.02, 760.03, 760.04, 760.05, 761, 764, 765

[56] References Cited

U.S. PATENT DOCUMENTS

| 4,868,777 | 9/1989 | Nishiyama et al. | 364/746.2 |
| 5,280,439 | 1/1994 | Quck et al. | 364/760 |
| 5,289,398 | 2/1994 | Miyoshi et al. | 364/746.2 |

OTHER PUBLICATIONS

Lyu, et al., "Redundant Binary Booth Recoding", 1995, Dept. of Computer Science and Engineering Southern Methodist University pp. 50–57.

*Primary Examiner*—Chuong Dinh Ngo
*Attorney, Agent, or Firm*—Beyer & Weaver, LLP

[57] ABSTRACT

A fast carry-sum form Booth encoder is used in a multiplicative divider to iteratively multiply one number by a series of numbers to produce the result of a divide or square root operation. The fast Booth encoder inputs a binary sum and a binary carry row representing the first number. The encoder adds the two numbers and at the same time Booth-encodes the result and outputs this result to a partial product generator to be combined with one of the series of numbers. Included in the fast Booth encoder are a multiplicity of interconnected logic cells. Each logic cell receives a number of distinct sequential bits from each of the binary sum and carry rows. The sequential bits from one binary number correspond to sequential bits in the other binary number. Each cell then produces an associated cell output. Each logic cell includes a carry bit generator for producing a number of carry bits to transmit to a next interconnected logic cell. Each cell also has an output generator for producing the cell output associated with the logic cell. Together, the cell outputs produced by each logic cell are at least a portion of a Booth encoded form of the sum of the pair of binary numbers. The logic is optimized so that a carry ripple passes through no more than two of the logic cells before being output, so that a carry ripple through all of the logic cells is avoided.

12 Claims, 13 Drawing Sheets

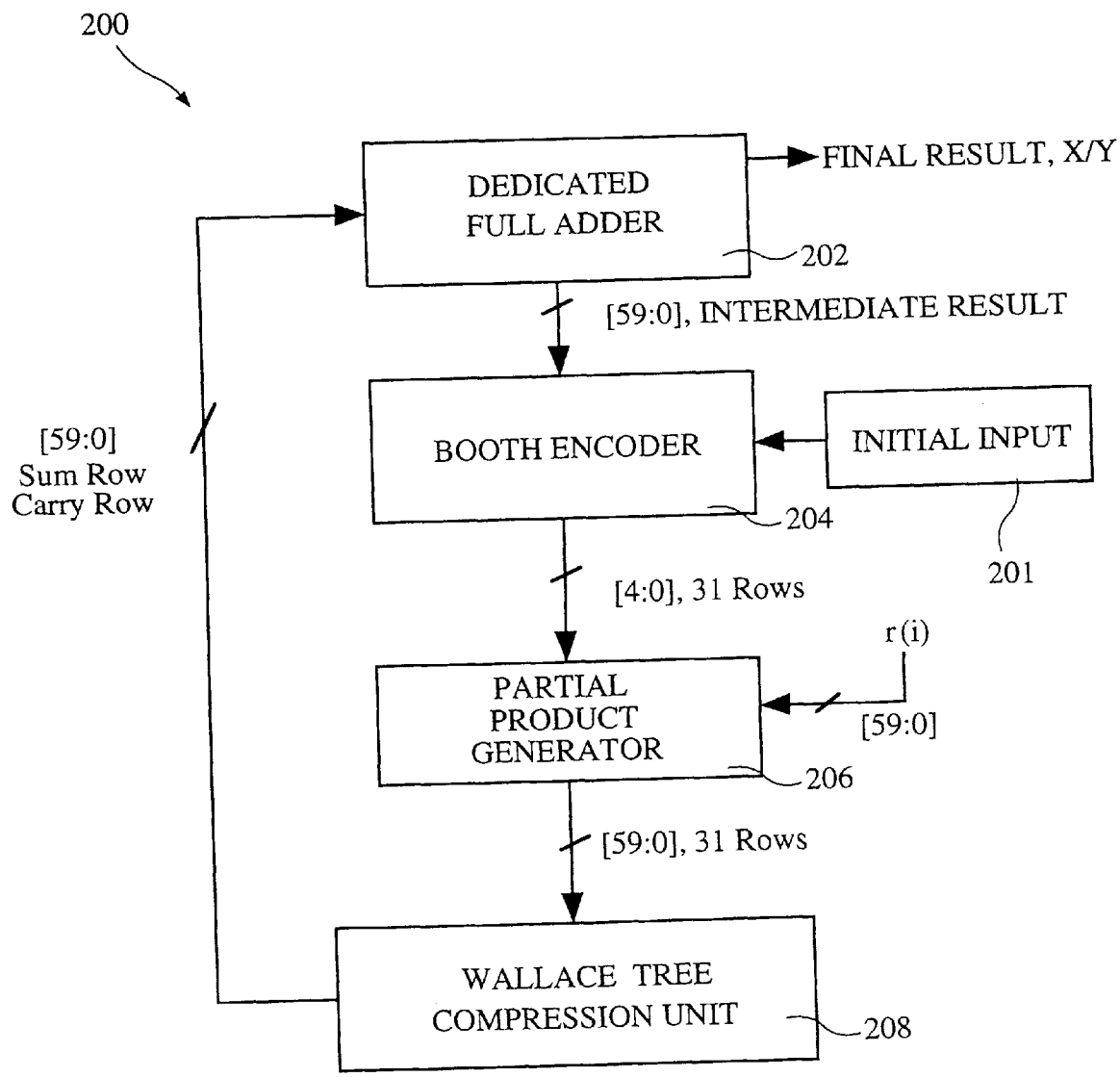

Cell Input and Output

| Carry [1:0]/ Sum[1:0] 1002 | Carry/Sum Value 1004 | C$_{IN}$[1:0] 1006 | C$_{IN}$ Value 1008 | C$_{out}$[1:0] 1010 | C$_{out}$ value 1012 | out[4:0] 1014 |
|---|---|---|---|---|---|---|
| 11/11 | 6 | 00<br>01,10<br>11 | 0<br>1<br>2 | 11<br>11<br>11 | 2<br>2<br>2 | 00001<br>00010<br>00100 |
| 11/10<br>10/11 | 5 | 00<br>10<br>01<br>11 | 0<br>1<br>1<br>2 | 10<br>11<br>10<br>11 | 1<br>2<br>1<br>2 | 01000<br>00001<br>10000<br>00010 |
| 10/10<br>11/01<br>01/11 | 4 | 00<br>01,10<br>11 | 0<br>1<br>2 | 01<br>01<br>01 | 1<br>1<br>1 | 00100<br>01000<br>10000 |
| 11/00<br>00/11<br>10/01<br>01/10 | 3 | 00<br>01,10<br>11 | 0<br>1<br>2 | 01<br>01<br>01 | 1<br>1<br>1 | 00010<br>00100<br>01000 |
| 10/00<br>00/10<br>01/01 | 2 | 00<br>01,10<br>11 | 0<br>1<br>2 | 01<br>01<br>01 | 1<br>1<br>1 | 00001<br>00010<br>00100 |
| 01/00<br>00/01 | 1 | 00<br>10<br>01<br>11 | 0<br>1<br>1<br>2 | 00<br>01<br>00<br>01 | 0<br>1<br>0<br>1 | 01000<br>00001<br>10000<br>00010 |
| 00/00 | 0 | 00<br>01,10<br>11 | 0<br>1<br>2 | 00<br>00<br>00 | 0<br>0<br>0 | 00100<br>01000<br>10000 |

Figure 15

FAST CARRY-SUM FORM BOOTH ENCODER

FIELD OF THE INVENTION

The present invention relates generally to number processing in a computer. More specifically, the present invention relates to an improved Booth encoder used in iterative multiplications.

BACKGROUND OF THE INVENTION

The central processing unit of a computer is used to perform many numeric functions. In particular, a floating point unit within the central processing unit of a computer typically performs the operations of division and square root, among others. Various techniques may be used to perform a division or square root operation to produce a result, although tradeoffs in speed and complexity exist. For example, certain subtractive division and square root algorithms converge on a result at a linear rate as a function of the precision of the operand in bits. On the other hand, multiplicative algorithms use iterative approximation and converge quadratically, and hence, are preferable because they are faster.

Goldschmidt's algorithm is the most attractive of several of the multiplicative algorithms because the numerator and denominator multiplications used are independent operations. The independent nature of these multiplications provides a more efficient use of pipelined multiplier hardware. An example of performing a floating point division using Goldschmidt's algorithm is illustrated in FIG. 1. FIG. 1 shows a numerator X to be divided by a denominator Y in order to produce a quotient. In Goldschmidt's algorithm, both the numerator and the denominator are multiplied by a series of numbers labeled $r(0)$ through $r(n)$. The numbers $r(i)$ are chosen such that the denominator converges to the value "1", which necessarily implies that when the numerator is multiplied by these exact same numbers $r(i)$, it will converge to the quotient, X/Y.

In other words, computing this quotient X/Y with Goldschmidt's algorithm involves multiplying both the numerator and denominator by successive values $r(i)$ so that $X(i)+1=X(i)*r(i)$ and $Y(i)+1=Y(i)*r(i)$. Successive values of $r(i)=2-Y(i)$ are chosen so that $Y(i)$ converges to the number 1 and therefore $X(i)$ approaches the quotient of X divided by Y. To ensure rapid convergence the initial value of $r(i)$ is set to a seed value close to 1/Y. Seed values are loaded into a look up table and are indexed with the leading digits of Y. Square roots are similarly computed by letting X=Y=A and iterating over $X(i+1)=X(i)*r(i)$ and $Y(i+1)=Y(i)*r(i)*r(i)$. Successive $r(i)$'s are chosen so that $Y(i)$ converges to the number "1" and $X(i)$ converges to the square root of A. Also, $r(i)=(3-Y(i))/2$ and a pre-scaled value close to the square root of Y is read from a look up table and used as the initial value of $r(i)$. Thus, to perform division or a square root operations in the floating point unit of a microprocessor, Goldschmidt's algorithm uses iterative multiplications in order to reach a result.

Accordingly, floating point units incorporating an expensive multiplier may make iterative use of the multiplier for implementing fast algorithms for division, square root, and/or transcendental function computation by extended polynomial approximation. The process of multiplication can be thought of as having two main steps, the first step being the generation of partial products, and the second step being the reduction of these partial products to the final product. A carry-save adder is usually used in partial product reduction to two rows of a result, and one full adder is needed to reduce to one row of a result.

The simplest form of multiplication of a multiplicand (traditionally the numerator) by a multiplicator (the denominator) operates bit by bit on the multiplicator and produces one partial product corresponding to the multiplicand for each bit in the multiplicator. Thus, for an N-bit multiplicand and an M-bit multiplicator, an N by M bit multiplier along these lines generates M partial products to be added, each N bits long. To build this multiplier, a stack of M adders is used to sum up the product. Each partial product is either the value of the multiplicand or the value zero, determined by the individual bits of the multiplicator. Such a multiplier is simple but costly in size, and M additions are necessary to compute the product. However, it is possible to reduce the number of partial products to be added by using Booth encoding.

Booth encoding allows the multiplication process to skip through contiguous strings of 1's and contiguous strings of 0's in the multiplicator. For an N-bit multiplicator, no more than N/2 partial products are created. Modified Booth encoding processes overlapping groups of bits at a time, the number of new bits B per group being described by a radix 2(to the B power). Radix 2(to the B power) Booth encoding generates only $(N/B)+1$ partial products, and lends itself to parallel hardware implementation. However, when the partial products from one multiplier operation are first added, the result is initially in a redundant format, such as carry-sum. That is, the result takes the form of two rows of binary information, a carry row and a sum row. And in an iterative multiplication, this result needs to be fed back into the Booth encoder before it is again combined with a next number to generate additional partial products. But before this result may undergo Booth encoding again, it must first be processed by an adder to put it into binary format. In other words, the carry row and the sum row must be added first, because the conventional Booth encoder only accepts one row of information. Performing such additions after each multiplication in a series of multiplications consumes precious time.

FIG. 2 shows a prior art multiplicative divider 200 used in quotient generation that uses iterative multiplication. Such a multiplicative divider may be used to perform the division of X by Y using iterative multiplication of a series of numbers $r(0)$ through $r(n)$ as shown in FIG. 1. Shown is an initial input 201, a conventional Booth encoder 204, a partial product generator 206, a Wallace tree compression unit 208 and a 60-bit dedicated full adder 202. The Booth encoder 204 may be any typical Booth encoder as is known in the art. The partial product generator 206 takes as one operand the output of the Booth encoder and takes as a second operand one of the series of numbers $r(i)$. Partial product generators are known in the art and may be implemented using any suitable technique. The Wallace tree compression unit 208 is also known in the art. Wallace tree compression takes the partial products from the partial product generator and using rows of carry-save adders compresses the partial products into two rows, a sum row and a carry row. The 60-bit adder is a conventional adder that adds the sum row and the carry row and feeds the result into the Booth encoder 204. The initial input 201 is used to feed an initial input such as the value X into the Booth encoder 204. The operation of this multiplicative divider will now be described with reference to FIG. 3.

FIG. 3 is a flow chart showing a prior art technique for multiplying a quantity X by a series of numbers $r(0)$ through $r(n)$. For illustrative purposes, the quantity X and each of the numbers r(i) are 60-bit numbers. In a first step 302 a variable Intermediate Result is set equal to the quantity X. This variable Intermediate Result holds the value of X as it is being modified by successive multiplications by the series of numbers r(i). Also in this step, the index i for each of the r(i) is set equal to 0. Next, in step 304, the Intermediate Result is fed into the Booth encoder 204. The first time through the loop the Intermediate Result will simply be the initial value of X. On later iterations through this loop, the variable Intermediate Result will represent a changing value of X as it is multiplied by successive values for the r(i). For a given iteration through the loop of the flowchart, the Booth encoder is used to encode the current Intermediate Result using the conventional Booth algorithm. In step 306 the partial product generator takes as one input the Booth encoded Intermediate Result and takes as a second input the next number r(i) in order to form the partial products for that multiplication. The partial product generator 206 then outputs 31 partial products (or rows) of 60 bits each. In step 308 the Wallace tree compression unit 208 uses carry save hardware to perform compression in order to reduce the 31 rows of partial products into one sum row and one carry row of 60 bits each.

Because the conventional Booth encoder will only accept one row of data, this sum row and carry row must be added together before being fed into the Booth encoder for the next iteration of the algorithm. Thus, in step 310, an additional dedicated full adder must be used to add the sum row and carry row to produce the new Intermediate Result. Thus, it can be seen that this step of adding is performed every time through the loop of the algorithm and adds to the length of time to perform a division.

Continuing with FIG. 3, step 312 then checks whether the multiplication is done. If so, then this operation is over and the final result X/Y may be output from the 60-bit full adder 202. However, if the multiplication is not yet finished, then in step 314 the index i is incremented by 1 to prepare for another iteration through the loop. The loop then continues when this 60-bit Intermediate Result is fed from the 60-bit dedicated full adder 202 back into the Booth encoder 204 once again. The algorithm continues in this iterative fashion until the multiplication is done. It should be noted that this conventional Booth encoder will only accept one row of data, and that the adding step of 310 is performed each time in the iteration, thus adding extra time per cycle and greatly increasing the time needed to perform such a multiplicative division. In addition, this technique requires the use of the additional 60-bit dedicated full adder 202, thus increasing the hardware complexity.

Various techniques have been used in order to avoid this additional adder and the extra cycle time because of it. Typically, an N-bit full adder is slow because as the two N-bit numbers are added, a carry generated in the lower order bits may ripple all the way through to the higher order bits. These high order bits must wait to be added until the carry has rippled all the way through the N bits. Carry look-ahead and carry select full adders may be used but are still relatively slow. It is for this reason that prior art techniques have attempted to create a design that avoids this carry ripple through all N bits. In particular, to avoid the N-bit full adder in iterative multiplicative algorithms, others have tried to design logic derived from an adder in order to generate the signals without a carry ripple, but the signals still need to be routed to a conventional Booth encoder. This technique is slow in terms of timing and delay. One such approach is disclosed in U.S. Pat. No. 5,280,439 issued on Jan. 18, 1994 to Quek, et al.

Another technique that has been used to avoid this extra cycle time is described in "Redundant Binary Booth Encoding" by Chung Nan Lyu and David W. Matula of Southern Methodist University, 1995 IEEE. This paper describes using a sign digit redundant coding scheme in order to avoid the N-bit full adder. But using this technique requires a sign digit multiplier array that is not as efficient and fast as a normal binary multiplier array. Also, there is overhead involved in the conversion of sign digit coding from and to binary coding.

In summary, a conventional Booth encoder is typically used in a multiplicative divider to reduce the number of partial products in the multiplier array. This conventional Booth encoder only takes one row of data. However, the outputs of an N-bit multiplier array in microprocessor applications are usually in the form of a carry row and a sum row. And in iterative multiplicative algorithms, the outputs of this N-bit multiplier array need to be fed back into the multiplier array. Thus, an N-bit full adder is needed to add these carry and sum rows together into one row of data so that the result may be fed back into the conventional Booth encoder. The addition performed by this N-bit full adder causes one cycle delay in each iteration which severely degrades the performance of the multiplication.

Therefore, it would be desirable to have a multiplying apparatus using a modified Booth encoder that dispenses with the need for this additional full adder. It would further be desirable for this multiplying apparatus to be fast and simple in design.

SUMMARY OF THE INVENTION

An embodiment of the present fast carry-sum form Booth encoder does not use an additional N-bit full adder and thus each iteration in the multiplying process is faster. The logic for this fast Booth encoder that incorporates an adder is derived directly from the operation of a Booth encoder and thus the logic is optimized. The present invention is implemented so that a carry ripple passes through less than all cells of the encoder, thus creating less delay.

One embodiment relates to a fast Booth encoder for encoding a pair of input binary numbers. The pair of input binary numbers may represent a sum row and a carry row in an iterative multiplication algorithm of a multiplicative divider. Included in the fast Booth encoder are a multiplicity of interconnected logic cells. Each logic cell receives a number of distinct sequential bits from each of the pair of input binary numbers. The sequential bits from one binary number correspond to sequential bits in the other binary number. Each cell then produces an associated cell output. Each logic cell includes a carry bit generator for producing a number of carry bits to transmit to a next interconnected logic cell. Each cell also has an output generator for producing the cell output associated with the logic cell. Together, the cell outputs produced by each logic cell are at least a portion of a Booth encoded form of the sum of the pair of binary numbers.

In another aspect, a multiplying apparatus for multiplying a first binary number by a second binary number uses a fast carry-sum form Booth encoder. The fast carry-sum form Booth encoder has as inputs a sum row and a carry row representative of the first binary number. The encoder is arranged to add the sum row and the carry row using a multiplicity of interconnected logic cells. Each logic cell generates a number of carry bits that are output to a successive logic cell. Each logic cell is arranged such that the carry bits are rippled through no more than two of the successive logic cells. The encoder also has a Booth output that is the Booth encoded form of the sum of the sum row and the carry row. This Booth output is fed to a partial product generator that generates partial products from the Booth output and the second binary number. These partial products are then fed to a compression unit for compressing the generated partial products into a next sum row and a next carry row. This next sum row and next carry row are representative of the result of multiplying the first binary number by the second binary number.

In a method aspect of the invention, a first binary number is multiplied by a series of binary numbers using a fast carry-sum form Booth encoder to produce a result. A sum row and a carry row representative of the first binary number are input into the fast Booth encoder. The fast Booth encoder adds the sum row and the carry row using a multiplicity of interconnected logic cells and produces a Booth output that is the Booth encoded form of the sum of the sum row and the carry row. Each logic cell generates a number of carry bits that are output to a successive logic cell such that the carry bits are rippled through no more than two of the successive logic cells. Next, partial products are generated from the Booth output and one of the series of binary numbers. Then, the partial products are compressed into a next sum row and a next carry row that are recursively input into the fast Booth encoder. The method operates in this recursive fashion to produce the product of the first binary number and the series of binary numbers.

In other embodiments of the present invention, the fast Booth encoder is a radix 4 encoder and each logic cell outputs two carry bits to a next logic cell. One of these bits depends only upon the inputs to that cell from the sum and carry rows, while the other bit depends upon these inputs and also upon a carry in bit from a preceding logic cell. The Booth encoded output from a logic cell depends upon both of the carry in bits from a preceding cell as well as the bits input from the sum and carry rows to that cell. The output from a given cell depends upon no more than inputs to the preceding two cells.

Thus, in the present fast Booth encoder less hardware is required and less time per cycle through the fast Booth encoder is needed because there is no extra step of adding a carry row to a sum row using an additional N-bit full adder.

BRIEF DESCRIPTION OF THE DRAWINGS

The invention, together with further advantages thereof, may best be understood by reference to the following description taken in conjunction with the accompanying drawings in which:

FIG. 1 illustrates a prior art technique for finding a quotient of two numbers using Goldschmidt's algorithm.

FIG. 2 illustrates a prior art multiplicative divider used in a floating point unit of a computer that uses a conventional Booth encoder and a full adder.

FIG. 15 is a truth table showing output values for a particular cell of FIG. 7 corresponding to the inputs to that cell.

DETAILED DESCRIPTION OF THE INVENTION

The fast carry-sum form Booth encoder of the present invention incorporates an adder in a novel fashion along with encoding logic in order to produce a Booth encoded output without the traditional delay associated with using an additional full adder. This fast carry-sum form Booth encoder accepts as inputs both a sum row and a carry row that are both added together and encoded within the novel Booth encoder. This fast Booth encoder may be used within a wide variety of applications where two rows of information need to be added together and a Booth encoded output needs to be formed. By way of example, the fast Booth encoder of the present invention may be used in a multiplicative divider where iterative multiplications are used to form a quotient. In particular, the fast Booth encoder may be used in the floating point divider within a central processing unit of a computer.

Figure 4:
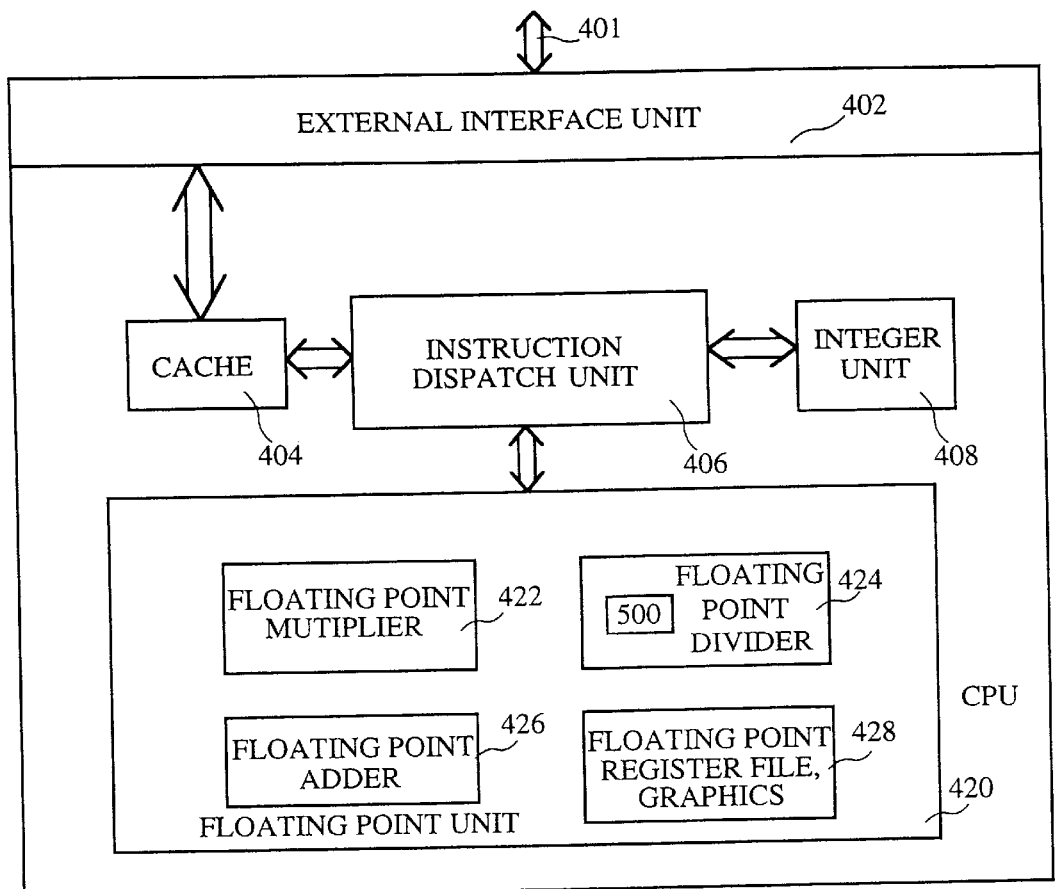
FIG. 4 is a central processing unit of a computer having a floating point divider according to one embodiment of the present invention.

An embodiment of a central processing unit (CPU) 400 in which the fast carry-sum form Booth encoder may be used is shown in FIG. 4. The CPU 400 has an I/O bus 401 that carries data and information between the CPU 400 and the rest of the computer system. This bus may carry a wide variety of information including data, addresses, instructions, etc. The CPU may have a wide variety of units and logic modules within it. Shown by way of example are an external interface unit 402, a cache 404, an instruction dispatch unit 406, an integer unit 408, and a floating point unit 420. The external interface unit 402 is used to communicate between the CPU and the rest of the computer. Information received is passed to a cache 404 which saves data information, addresses and instructions for later use. The instruction dispatch unit 406 receives instructions from the cache and passes these instructions to an integer unit 408 or to the floating point unit 420. Included within the floating point unit 420 are a floating point multiplier 422, a floating point divider 424, a floating point adder 426 and a floating point register file and floating point graphics 428. One skilled in the art will appreciate the general function of each of these units.

Figure 5:
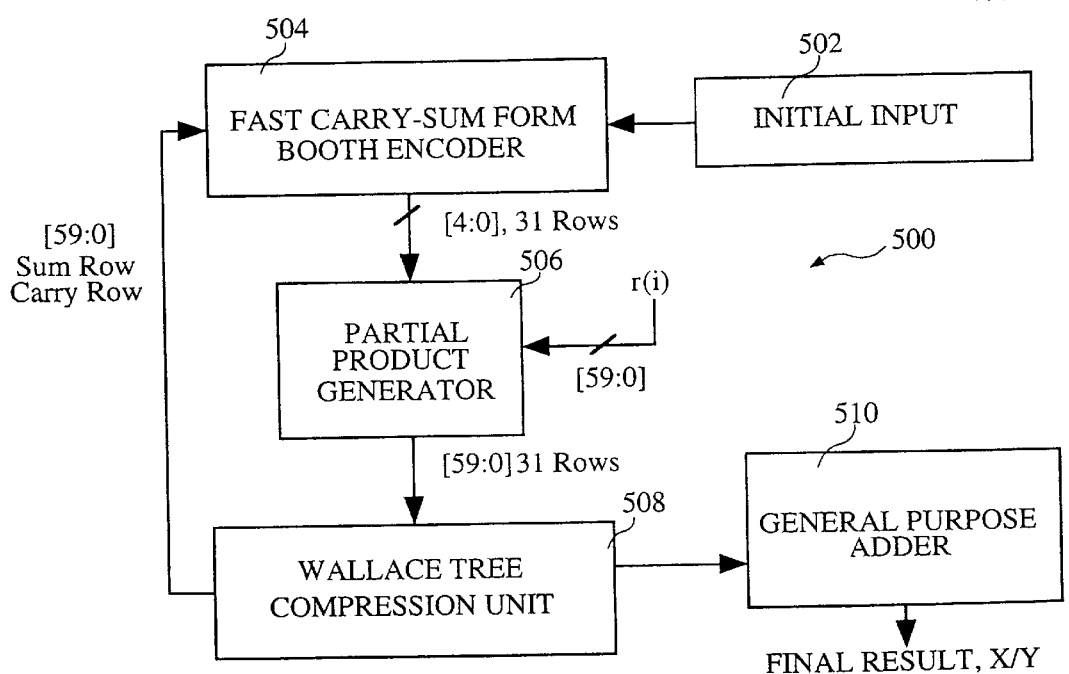
FIG. 5 illustrates a multiplicative divider having a fast carry-sum form Booth encoder according to one embodiment of the present invention.

The floating point divider 424 performs number processing functions such as division and square root. FIG. 5 illustrates a multiplicative divider 500 that may be used within the floating point divider 424 to perform iterative multiplications according to an embodiment of the present invention. The multiplicative divider 500 may be used in a wide variety of algorithms where iterative multiplications are useful. In particular, as discussed above, division or square root operations may be performed by using iterative multiplications. Thus, the multiplicative divider 500 may be used to perform such multiplications in order to determine a quotient or a square root. A method of using the divider of FIG. 5 will be explained in more detail below with reference to FIG. 6.

The multiplicative divider 500 includes an initial input 502, a fast carry-sum form Booth encoder 504, a partial product generator 506, a Wallace tree compression unit 508 and a general purpose adder 510. The initial input 502 is used to input an initial number into the fast Booth encoder 504, such as the value X. The partial product generator 506, the Wallace tree compression unit 508 and the general purpose adder 510 may be of conventional types as are known in the art. An implementation of the fast carry-sum form Booth encoder 504 will be explained in more detail below with reference to FIGS. 7 through 15. The multiplicative divider may be used with numbers of any length. For illustrative purposes, the use of this divider will be described below with reference to the multiplication of 60-bit binary numbers.

Figure 6:
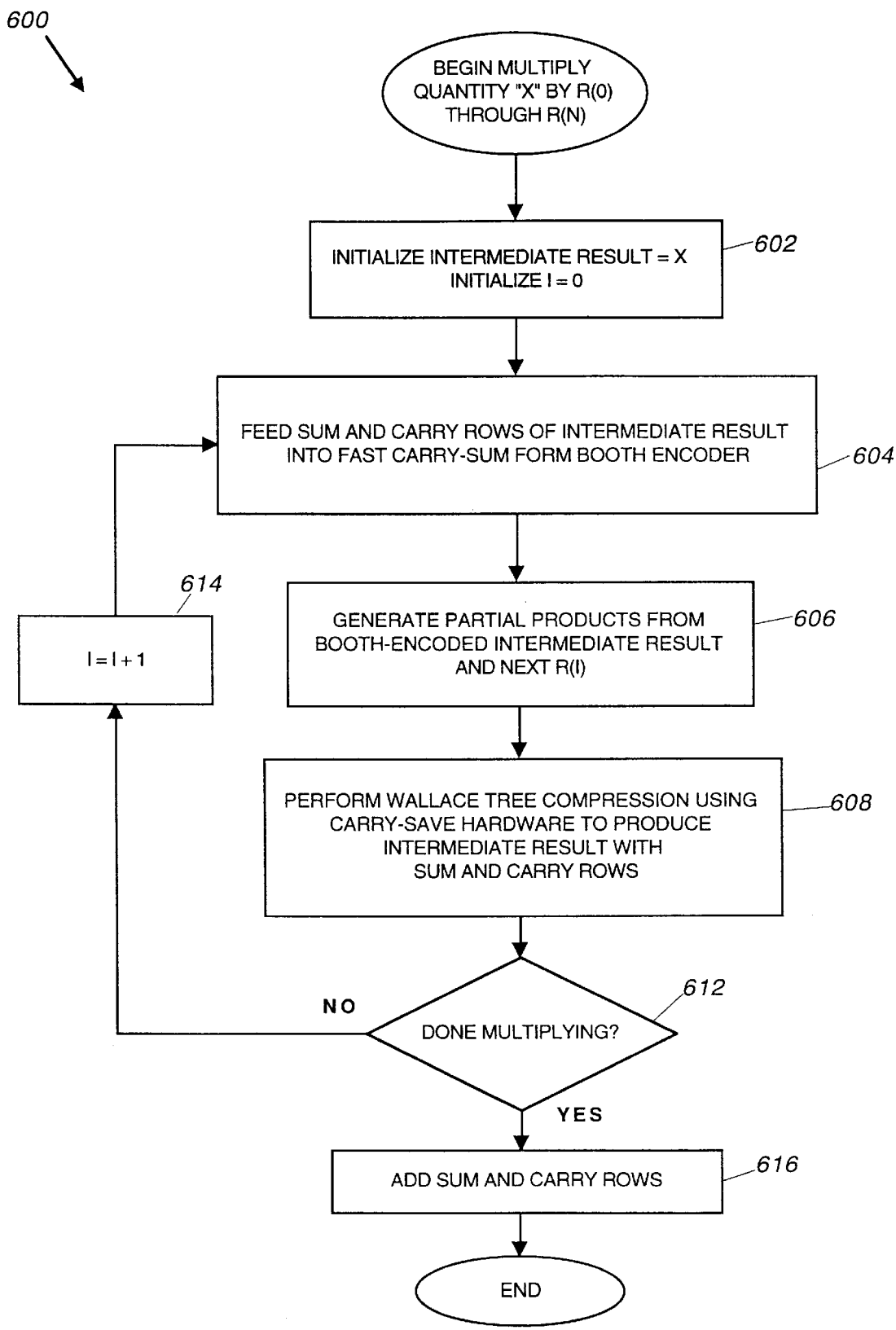
FIG. 6 is a flow chart showing a method for determining the quotient of two numbers using the multiplicative divider of FIG. 5 according to one embodiment of the present invention.

FIG. 6 shows a method 600 for determining the quotient of two numbers using the divider of FIG. 5. The method incorporates Goldschmidt's algorithm using iterative multiplications that are performed by the multiplicative divider of FIG. 5. This method determines the quotient of X/Y by multiplying a 60-bit quantity X by a series of 60-bit binary numbers r(0) through r(n). The numbers are chosen such that by multiplying the denominator Y by this same series yields the value "1". Thus, once the numerator X has also been multiplied by this series it must necessarily converge to the quotient X/Y.

In a first step 602 a variable Intermediate Result is set equal to the quantity X. This variable Intermediate Result holds the value of X as it is being modified by successive multiplications by the series of numbers r(i). Also in this step, the index i for each of the r(i) is set equal to 0. Next, in step 604, the sum and carry rows representing the Intermediate Result are fed into the fast Booth encoder 504. The first time through the loop the Intermediate Result is the initial value of X and is represented in the sum row, the carry row being all zeros. For this first iteration through the loop, the initial value X may be fed in from the initial input 502. On later iterations through this loop, the variable Intermediate Result holds a changing value of X as it is multiplied by successive values for the r(i) and is represented in both a sum row and a carry row. The sum and carry rows are produced by the Wallace tree compression of step 608. It should be noted that this fast Booth encoder 504 is capable of inputting both the sum and carry rows without the need for an additional N-bit full adder and does not incur the delay associated with such an adder. For a given iteration through the loop of the flowchart, the fast Booth encoder in this step 604 is used to encode the current Intermediate Result (input as a sum row and a carry row) and to output a Booth-encoded result. An implementation of the fast Booth encoder will be explained in more detail below with reference to FIGS. 7 through 15.

In step 606 the partial product generator 506 takes as one input the Booth-encoded Intermediate Result and takes as a second input the next number r(i) in order to form the partial products for that multiplication. The partial product generator 506 then outputs 31 partial products (or rows) of 60 bits each. In step 308 the Wallace tree compression unit 508 uses carry save hardware to perform compression in order to reduce the 31 rows of partial products into one sum row and one carry row of 60 bits each. These sum and carry rows of 60 bits each represent the next Intermediate Result that will be fed back into the fast Booth encoder 504 in step 604. Before the iteration continues, though, step 612 checks whether the multiplication is done. The multiplication is done if the numerator has been multiplied by all of the series of numbers r(0) through r(n).

If it is determined in step 612 that the multiplication is not done, then in step 614 the index i is incremented by 1 to prepare for another iteration through the loop. The loop then continues in step 604 when the sum and carry rows representing the 60-bit Intermediate Result are fed from the Wallace tree compression unit 508 back into the fast Booth encoder 504 once again. The algorithm continues in this iterative fashion until the multiplication is done. Once in step 612 it has been determined that the multiplication is complete then in step 616 the sum and carry rows representing the Intermediate Result from the Wallace tree compression unit are added together using a general purpose adder 510. This adder then produces the final result of X/Y. This general purpose adder 510 does not contribute to extra delay time in each iteration of the loop because it is only used once at the end of the multiplication to add the final sum and carry row to produce the final result. Also, as any general purpose adder of the CPU may be used to perform this addition, an additional dedicated adder for the multiplicative divider is not needed.

Figure 3:
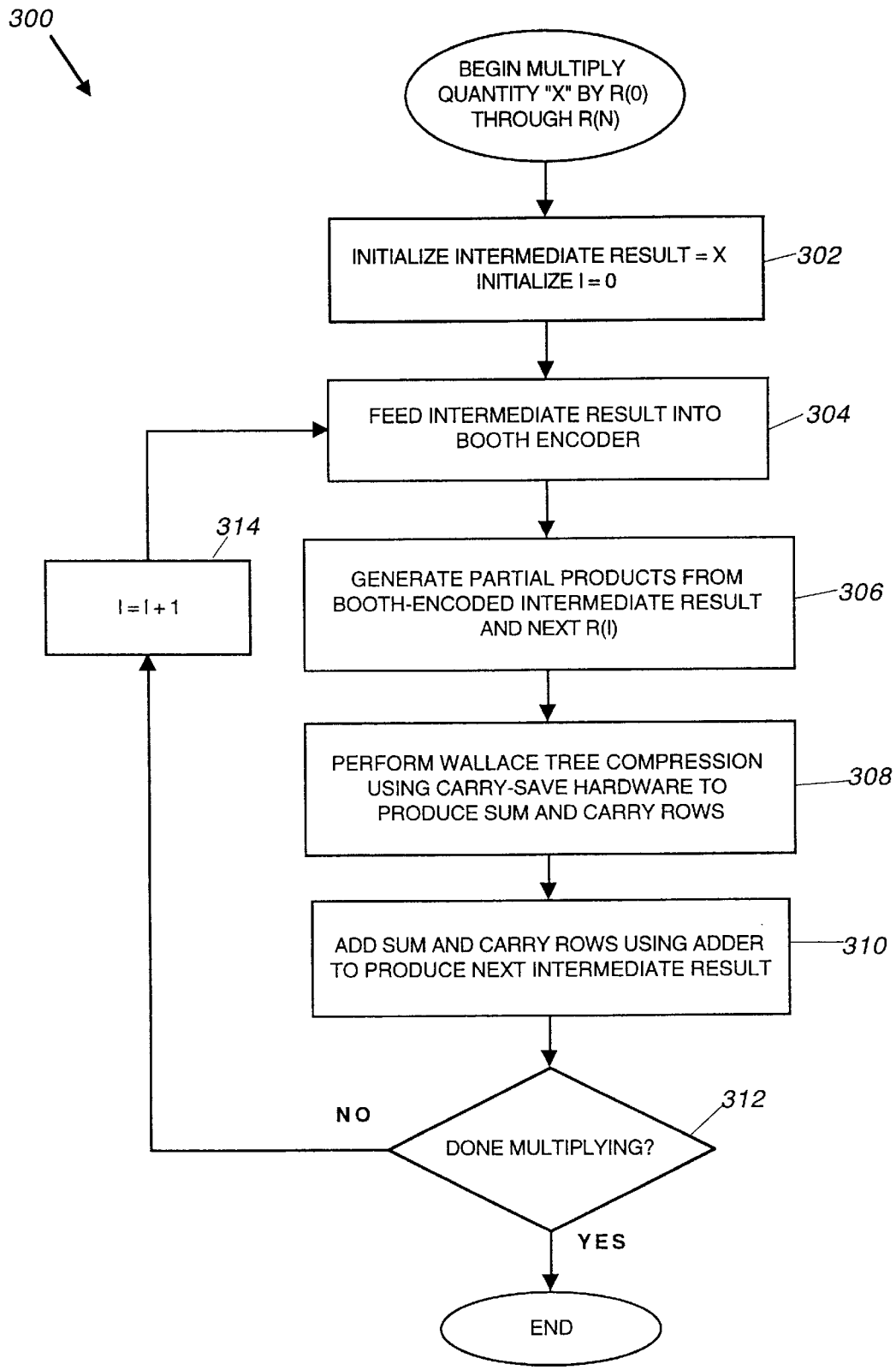
FIG. 3 is a flow chart showing a prior art method for determining the quotient of two numbers using the multiplicative divider of FIG. 2.
Figure 7:
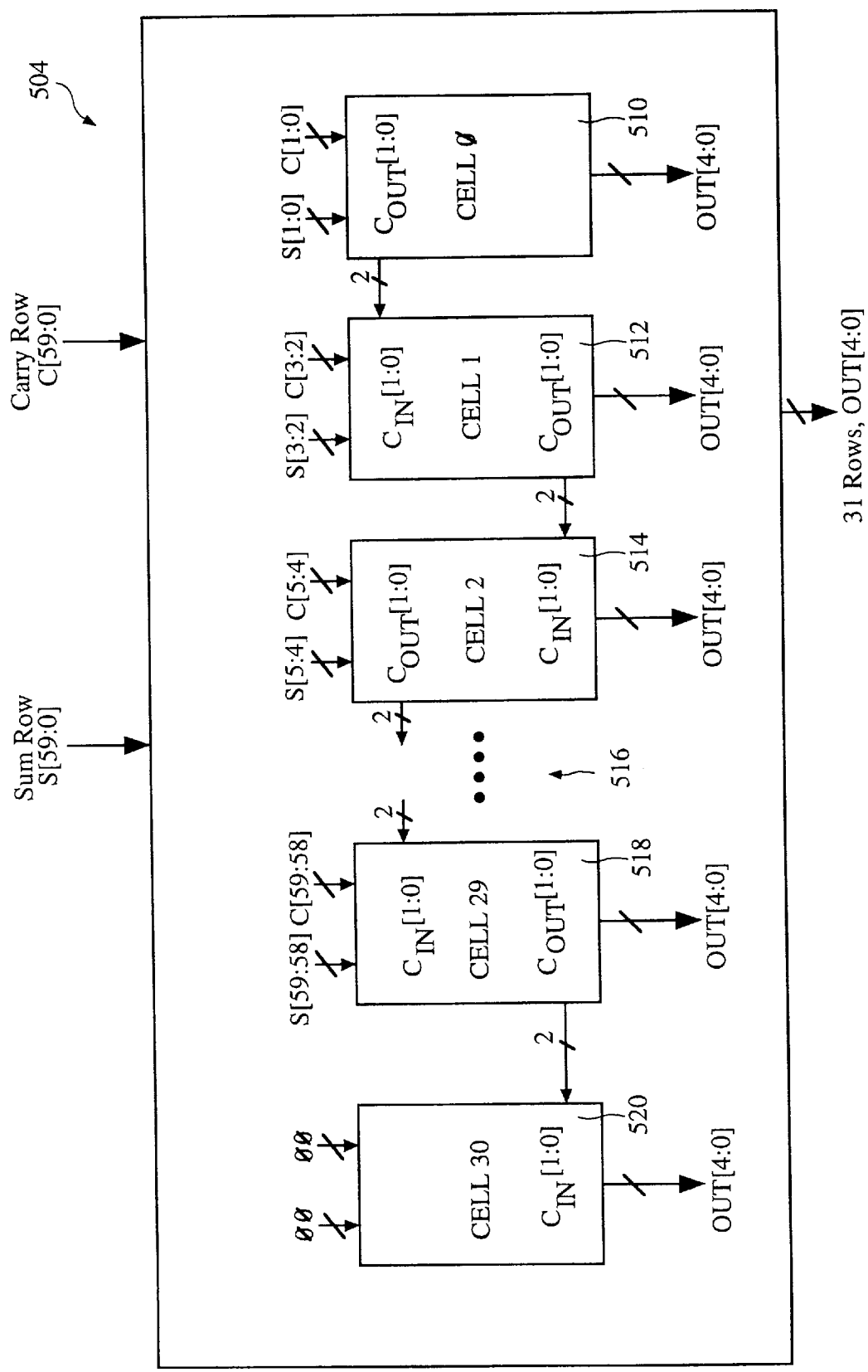
FIG. 7 illustrates the fast carry-sum form Booth encoder of FIG. 5 according to one embodiment of the present invention.
Figure 8:
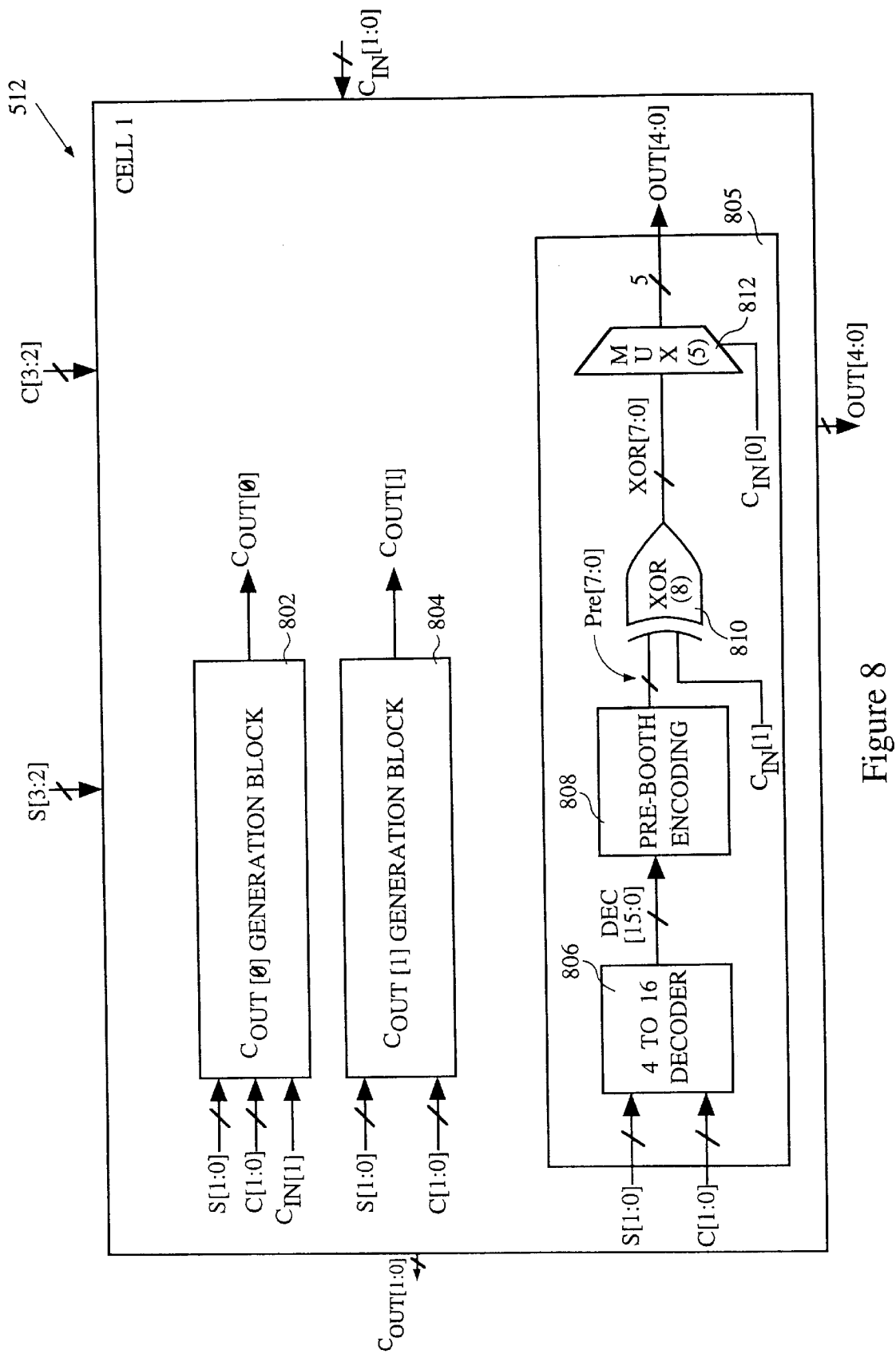
FIG. 8 illustrates a representative cell of the fast carry-sum form Booth encoder of FIG. 7 according to one embodiment of the present invention.

Thus, it can be seen that the iteration loop of the present invention does not require a separate step of using an additional N-bit full adder to add a sum row to a carry row as in step 310 of FIG. 3. The fast carry-sum form Booth encoder 504 performs the addition of the sum row and the carry row as well as Booth-encoding the output so as to reduce the delay through the encoder by eliminating carry ripple through all bits of the numbers being added. The implementation of this fast carry-sum form Booth encoder 504 will now be explained with reference to FIGS. 7 through 15. FIGS. 7 and 8 show block diagrams, FIGS. 9 through 14 illustrate hardware embodiments and FIG. 15 is a truth table for the fast Booth encoder.

FIG. 7 shows an embodiment of the fast carry-sum form Booth encoder 504 of FIG. 5 that is suitable for handling 60-bit floating numbers. It should be appreciated that other embodiments of the encoder 504 may handle numbers of any length. Input to this fast Booth encoder are the 60-bit sum row and the 60-bit carry row representing an intermediate result. Output from the fast Booth encoder are 31 rows of control lines with 5 bits per row. The fast Booth encoder has 31 logic cells used for combining distinct sequential bits of the sum and carry rows and for generating the Booth encoded output. Shown are Cell 0 (510), Cell 1 (512), Cell 2 (514), Cell 29 (518) and Cell 30 (520). Not shown are Cells 3–28 which are indicated at numeral 516. These cells are connected and implemented in a similar fashion as the cells shown.

It should be appreciated that a logic cell of FIG. 7, such as Cell 1, may be implemented in a variety of manners. By way of example, such a cell may be implemented in hardware as shown generally in FIG. 8. And specifically, the logic blocks 802 to 812 of FIG. 8 may be implemented in hardware as shown in the following FIGS. 9 through 14. It should also be appreciated that this hardware implementation of a cell is illustrative of one possible embodiment of the present invention. The actual values of output from a particular cell are given by the truth table of FIG. 15 which will be explained in more detail below.

The fast Booth encoder 514 may also be implemented using any particular radix. By way of example, the fast Booth encoder 514 is a radix 4 Booth encoder which means that 2 sequential bits at a time from each of the sum row and carry row are "looked at" or combined by the fast Booth encoder in order to produce the Booth encoded output. Another radix may also be used. For example, a radix 8 Booth encoder would combine 3 sequential bits at a time from each of the sum and carry rows in order to produce an output. Also, a radix 8 encoder would have a different number of output control bits. The number of output control bits from the encoder also depends upon the partial product generation implementation. In addition, the number of carry out bits from a given cell for a higher radix encoder will increase. Such a higher radix Booth encoder produces fewer partial products which is advantageous but is more complex and is slower.

Thus, because this embodiment of the present invention is implemented as a radix 4 Booth encoder, each cell in the encoder will combine 2 bits at a time from each of the sum row and carry rows in order to produce a carry out for the next cell and an output from the fast Booth encoder. For example, Cell 0 receives the first two least significant bits from the sum row and the first two least significant bits from the carry row. Likewise, Cell 1 receives the second pair of bits from each of the sum row and the carry row, namely S[3:2] and C[3:2]. Cell 1 also receives from the previous cell, Cell 0, an input of two carry bits, namely C(in)[1:0].

Thus, each cell receives as input two sequential bits from each of the sum and carry rows and also two carry in bits from the previous cell. Cell 0, being the first cell, does not receive any carry in bits as input. Each cell then combines these input bits to produce a carry output for the next cell and an encoder output as will be explained below with reference to FIG. 8. As shown in Cell 1, Cell 1 produces a carry out of two bits, namely C(out)[1:0], and an encoder output of five bits, namely OUT[4:0]. The two carry out bits are passed on to the next Cell 2 and the five output bits are output as one of the 31 rows from the encoder. It should be appreciated that cells 2–29 are implemented in much the same way as Cell 1.

Cell 30 (or the sign extension cell) is used for sign extension and overflow operations. It does not receive as inputs any bits from the sum and carry rows but receives only 0's for its sum and carry inputs. Cell 30 also receives two carry in bits from cell 29, namely C(in)[1:0]. Cell 30 also outputs five control bits, namely OUT[4:0]. Accordingly, the fast Booth encoder 504 takes the sum and carry rows as inputs and produces a Booth-encoded result in the form of 31 rows of five control bits each. These 31 rows are then fed to the partial product generator 506 of FIG. 5 to be combined with the next 60 bit number r(i).

FIG. 8 shows in more detail the implementation of a particular logic cell from FIG. 7. In particular, Cell 1 is shown for illustrative purposes. A truth table for developing the outputs of a particular cell based upon its inputs will be explained below with reference to FIG. 15. Exemplary Cell 1 has inputs S[3:2] and C[3:2] which are the second pair of bits from the sum and carry rows respectively. Cell 1 also receives two carry in bits, namely C(in)[1:0], that come from Cell 0. Cell 1, in turn, outputs two carry out bits, namely C(out)[1:0] which are passed on to Cell 2 and five output bits, namely OUT[4:0]. Cell 1 includes a first carry bit generation block 802, a second carry bit generation block 804 and an output generator block 805 for generating the five output bits that includes internal blocks 806 through 812.

The fast Booth encoder of the present invention avoids carry ripple through every cell of the encoder in order to speed up the process of combining every two bits. As described in the background, a conventional full adder typically has a carry ripple through all bits resulting in a much longer addition time. Carry ripple through all cells is avoided as explained below. The first carry bit generation block 802 generates the first carry out, namely C(out)[0] by combining the two bits from the sum and carry rows along with one carry in bit from the previous cell, namely C(in)[1]. On the other hand, the second carry bit generation block generates a value for the second carry out bit, namely C(out)[1], by only combining the two bits from the sum and carry rows. Generation of the second carry out bit, C(out)[1] does not depend upon any of the carry in bits from a previous cell, but only upon the bits input from the sum and carry rows. This feature assists in avoiding a carry ripple through all cells of the present invention. Also, the design results in only five to six gate delays from the inputs to the fast Booth encoder to its outputs.

In other words, the second carry out bit, C(out)[1], is not a function of any of the carry in bits, it is only a function of the two bits from the sum and carry rows input to the current cell. And the first carry out bit, C(out)[0], is a function of the sum and carry row bits input to the current cell and the second carry in bit, C(in)[1]. And this second carry in bit is the second carry out bit, C(out)[1] from the previous cell. And this second carry out bit from the previous cell only depends upon the two bits from the sum and carry rows input to that previous cell. Thus, the carry output from a given cell depends only on the previous two cells. Therefore, any carry produced by a given cell will not ripple through all cells creating extra delay. In other words, for a given cell I, its carry out depends only upon the inputs to Cell I-1 and to Cell I-2. If the first carry out bit of a given cell, C(out)[0], were also dependent upon the previous cell's output C(out)[0], then a carry ripple would propagate through all cells and create a longer delay in creating a Booth output.

A specific example is shown with reference to the outputs from Cell 2 of FIG. 7. Cell 2 has outputs OUT[4:0] that depend upon bits S[5:4] and C[5:4] from the sum and carry rows and that depend upon two carry in bits C(in)[0] and C(in)[1] that are input from Cell 1. From the Cell 1 one perspective, these bits to be output to Cell 2 are labeled C(out)[0] and C(out)[1]. These two carry out bits from Cell 1 are generated as shown in FIG. 8. That is, bit C(out)[1] only depends upon inputs to Cell 1 from the sum and carry rows. And bit C(out)[0] depends upon these same inputs from the sum and carry rows and also on a carry in bit to Cell 1, namely C(in)[1]. But because input bit to Cell 1 C(in)[1] is really bit C(out)[1] output from Cell 0, it should be apparent that this bit output from Cell 0 C(out)[1] only depends upon the sum and carry row inputs to Cell 0. Thus, outputs OUT[4:0] from Cell 2 only depend upon inputs to Cell 1 and to Cell 0 and a carry ripple through all of the cells is avoided. The fast Booth encoder takes only about 0.6 nano seconds to produce a result, whereas prior art Booth encoders may take as long as 1.6 nano seconds. This speed improvement is also due in part to fewer gate delays required by the fast Booth encoder.

The five output control bits, namely OUT[4:0], that are output from each cell are developed using the logic shown in FIG. 8 at 806 through 812. This logic will be explained using Cell 1 as an example. The two sum bits and the two carry bits from the sum and carry rows, respectively S[3:2] and C[3:2], are first fed into a 4 to 16 decoder 806. The output from this decoder is 16 lines, Dec[15:0], that are fed into a pre-Booth encoding unit 808. The pre-Booth encoding unit has 8 output lines, Pre[7:0], each of which is fed into an XOR gate 810 along with the second carry in bit C(in)[1]. This group of 8 XOR gates 810 produce 8 outputs, XOR [7:0], which are combined two at a time to feed into each of one of five multiplexers 812. Each of the five multiplexers is controlled by the first carry in bit C(in)[0]. Each of the five multiplexers 812 produces one output line for a total of five outputs which form the output from the fast Booth encoder, namely OUT[4:0].

Figure 9:
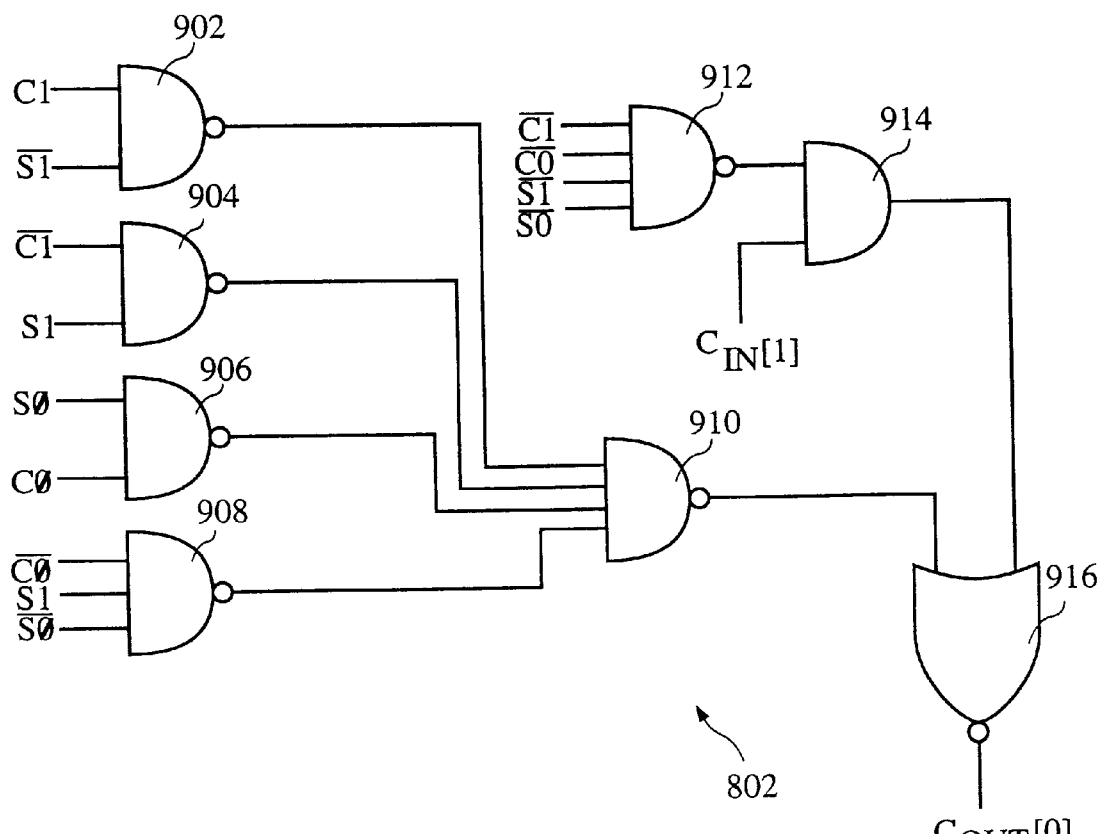
FIG. 9 illustrates an embodiment of the first generation block of FIG. 8.

FIG. 9 through FIG. 14 illustrate one possible embodiment of a hardware implementation of a cell, such as Cell 1 of FIGS. 7 and 8. FIG. 9 illustrates a hardware implementation of the first carry out generation block 802 of FIG. 8. Gate 902 takes signals C[1] and the complement of S [1]; gate 904 takes signals S [1] and the complement of C[0]; gate 906 takes signals C[0] and S[0]; gate 908 takes signals S[1], the complement of C[0] and the complement of S[0]. NAND gates 902 through 908 then combine these inputs as shown and pass their output to a further NAND gate 910. NAND gate 912 accepts the compliment of each sum and carry row bit and passes its output to an AND gate 914 to be combined with the carry in bit C(in)[1]. The outputs from gates 910 and 914 are then passed into NOR gate 916 which generates the first carry out bit, C(out)[0].

Figure 10:
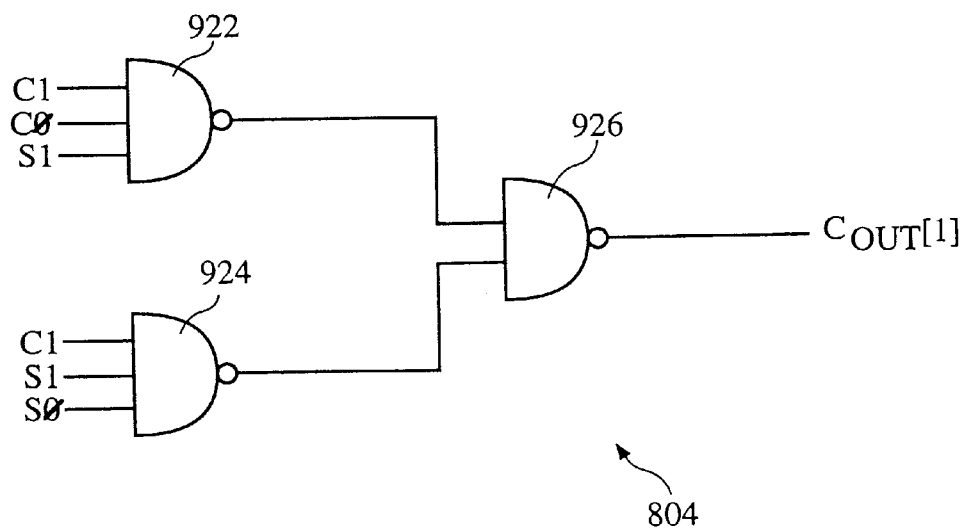
FIG. 10 illustrates an embodiment of the second generation block of FIG. 8.

FIG. 10 illustrates a hardware implementation of the second carry out generation block 804 of FIG. 8. Gate 922 takes signals C[1], C[0] and S[1]; gate 924 takes signals C[1], S[1], and S[0]. These carry and sum row bits are combined as shown using NAND gates 922 and 924 which each send an output to NAND gate 926. The output of this NAND gate is the second carry out bit, C(out)[1].

Figure 11:
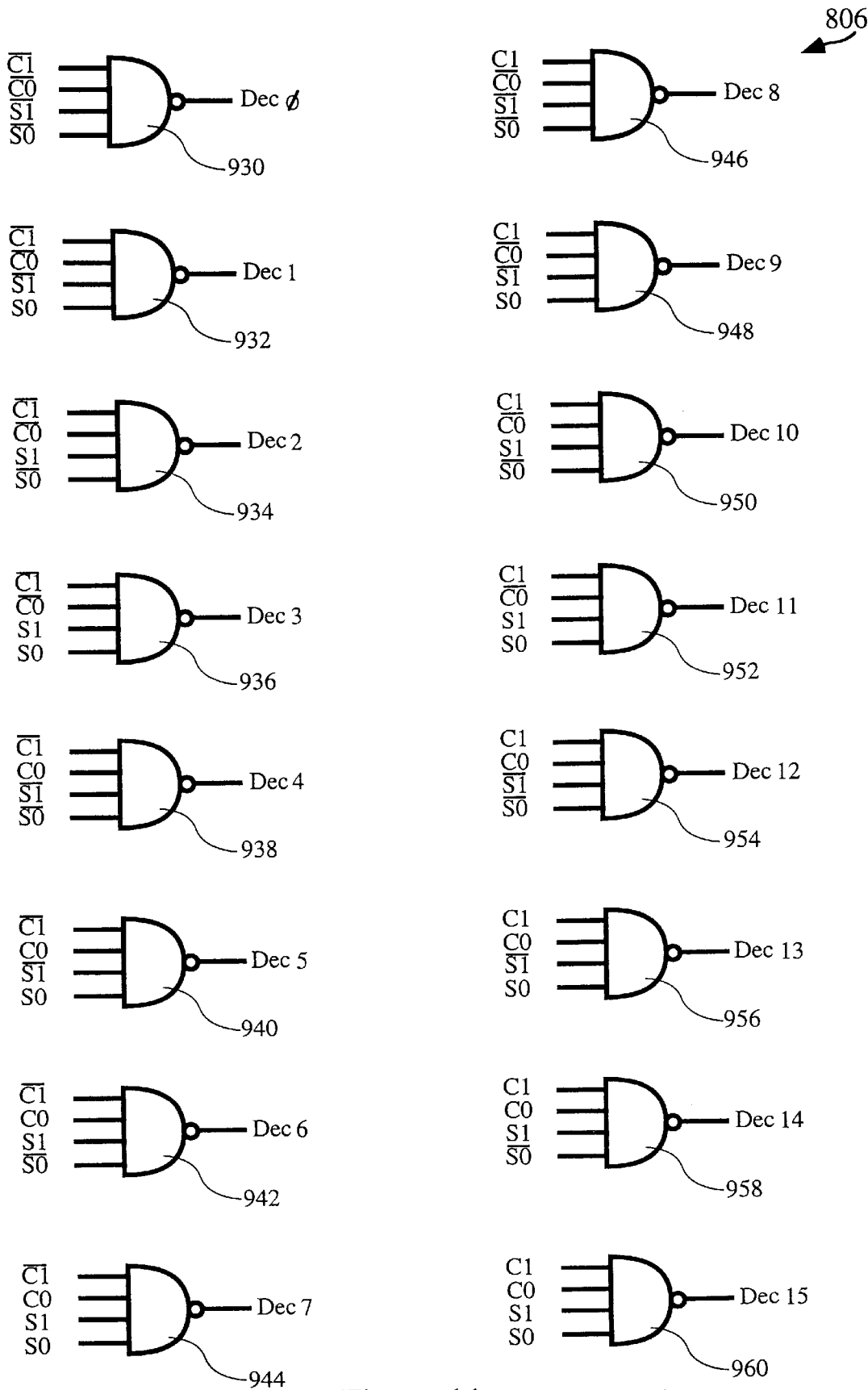
FIG. 11 illustrates an embodiment of the decoder of FIG. 8.

FIG. 11 illustrates a hardware implementation of the 4 to 16 decoder 806 of FIG. 8. NAND gates 930 through 960 combine various of the sum and carry row bits as shown in order to generate the 16 decoder output bits, Dec[15:0].

Figure 12:
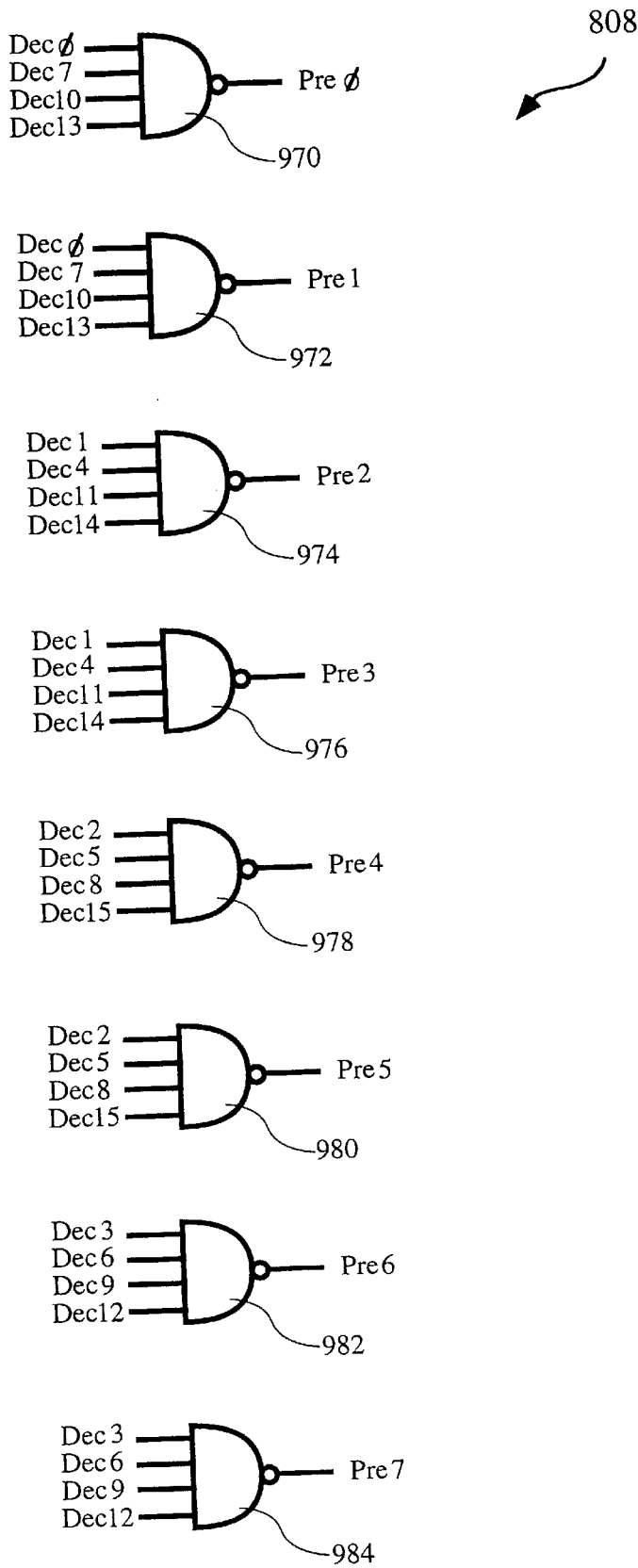
FIG. 12 illustrates an embodiment of the pre-Booth encoding unit of FIG. 8.

FIG. 12 illustrates a hardware implementation of the pre-Booth encoding unit 808 of FIG. 8. NAND gates 970 through 984 combine various of the decoder outputs as shown in order to generate the 8 output bits from this unit, namely Pre[7:0].

Figure 13:
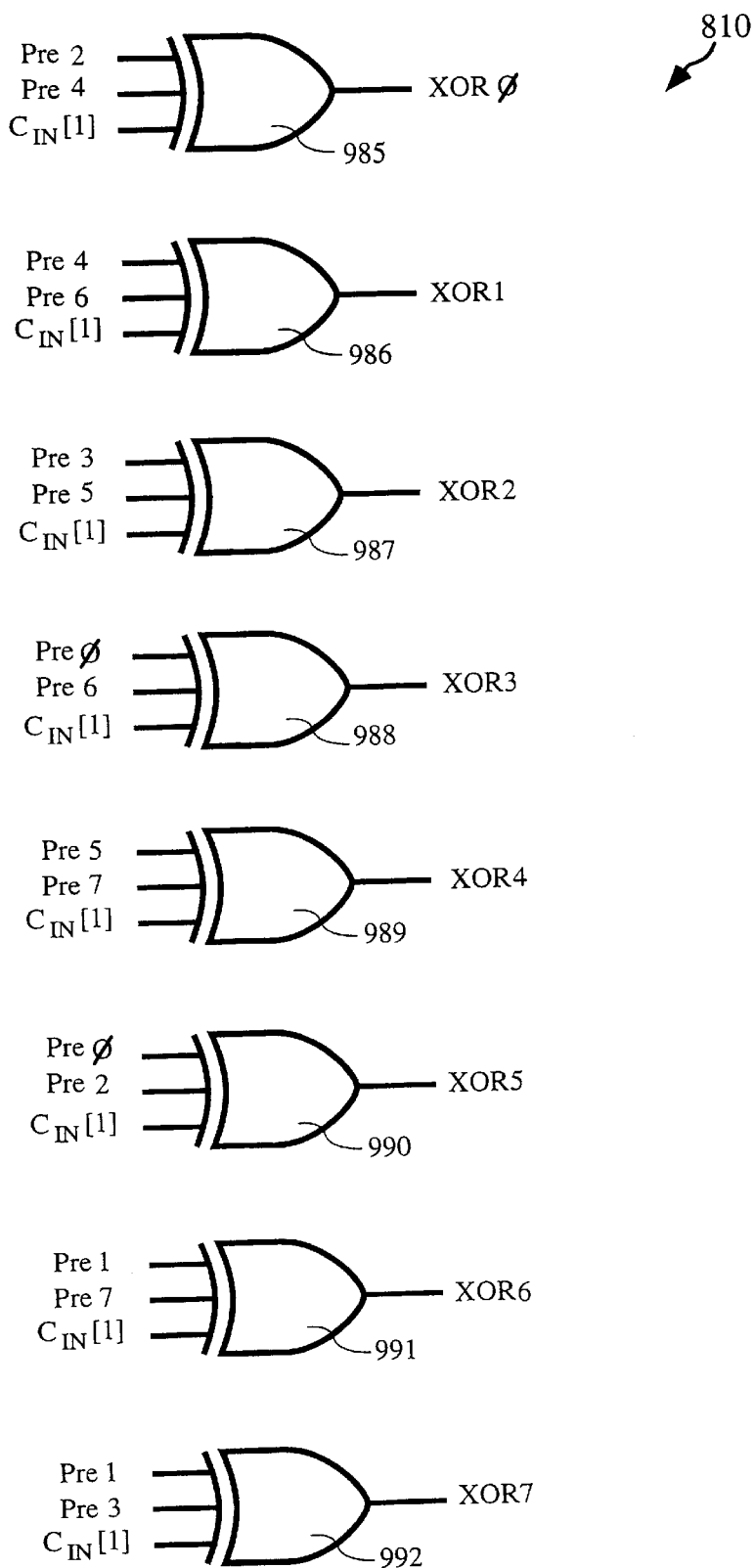
FIG. 13 illustrates an embodiment of the XOR logic of FIG. 8.

FIG. 13 illustrates a hardware implementation of the XOR logic 810 of FIG. 8. Shown are 8 XOR gates 985 through 992 which accept as inputs the second carry in bit, C(in)[1], and various of the output bits from the pre-Booth encoding unit 808 as shown. The output from each of these XOR gates form the output signals from this unit, namely XOR[7:0].

Figure 14:
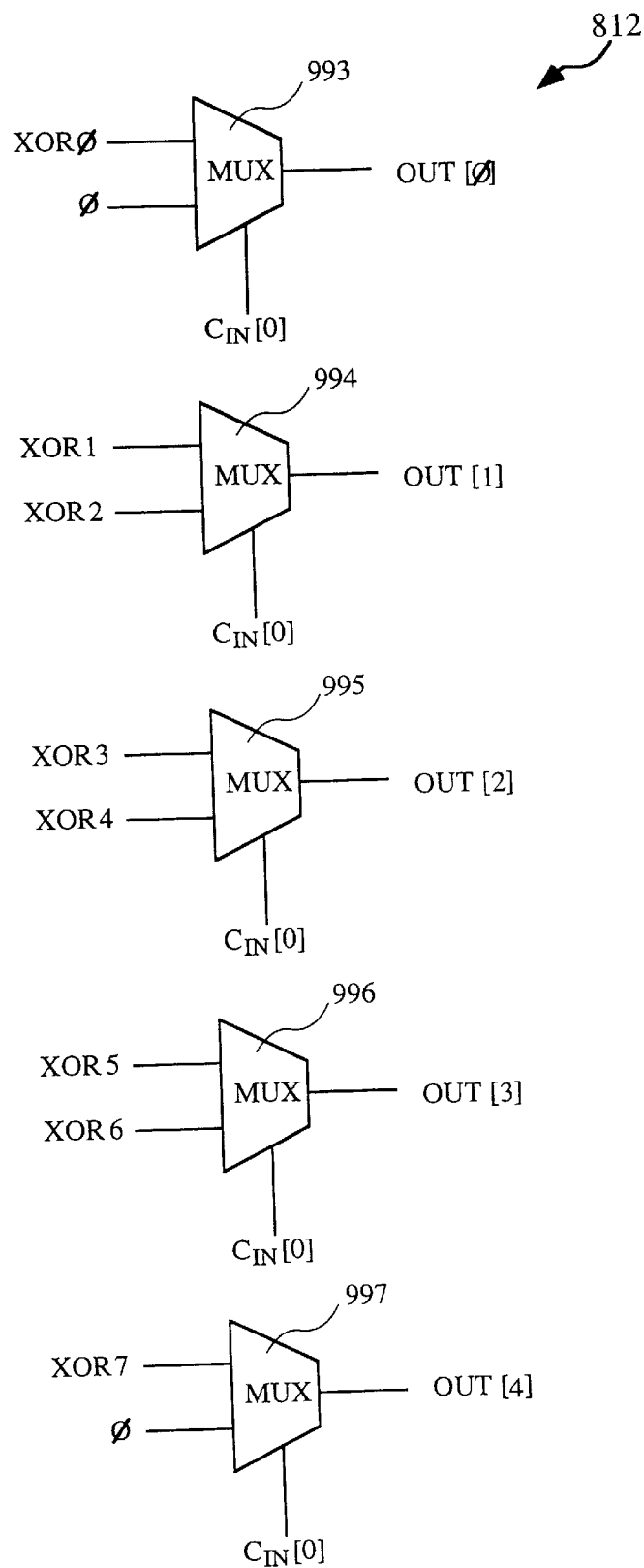
FIG. 14 illustrates an embodiment of the multiplexer logic of FIG. 8.

FIG. 14 illustrates a hardware implementation of the multiplexer unit 812 of FIG. 8. Shown are the five multiplexers 993 through 997 that make up this unit. Each multiplexer accepts as a control line the first carry in bit, namely C(in)[0]. Each multiplexer accepts a combination of the output bits from the XOR unit 810 as shown. The outputs from each of the five multiplexers form the output control signals from the cell, namely OUT[4:0].

Turning now to FIG. 15, a truth table 1000 is given that may be implemented as shown in the previous FIGS. 8 through 14. Hardware logic may be used in a wide variety of manners in order to implement the relationships shown in this truth table. The truth table shows the relationship between the input values to an individual cell (such as exemplary Cell 1 of FIG. 8) and the output of a cell. Columns 1002 through 1008 indicate possible inputs to a cell, and columns 1010 through 1014 show the outputs corresponding to these inputs.

A first column 1002 indicates values for the two bits from each of the sum and carry rows received by the cell. Column 1004 gives an encoded value for these sum and carry bits of column 1002. Column 1006 indicates the possible values of the two carry in bits which have come from the previous cell for each of various values for the sum and carry row bits. It should be noted that in certain cases two different values for these two carry in bits will yield the same output from the cell. This redundancy assists in reducing the carry ripple effect through all of the logic cells of the fast Booth encoder. Column 1008 gives an encoded value for the two carry in bits of column 1006.

Column 1010 gives a value for each of the two carry out bits from a particular cell based upon values for the two bits from the sum and carry rows and from the two carry in bits from a previous cell. Column 1012 gives an encoded value for the two carry out bits from column 1010. Column 1014 gives a value for the five output bits from the fast Booth encoder which are based upon the two input bits to the cell from the carry and sum rows and from the two carry in bits from a previous cell. It should be appreciated that one of skill in the art may use this truth table in order to implement a cell of the present invention in any suitable manner.

Figure 16:
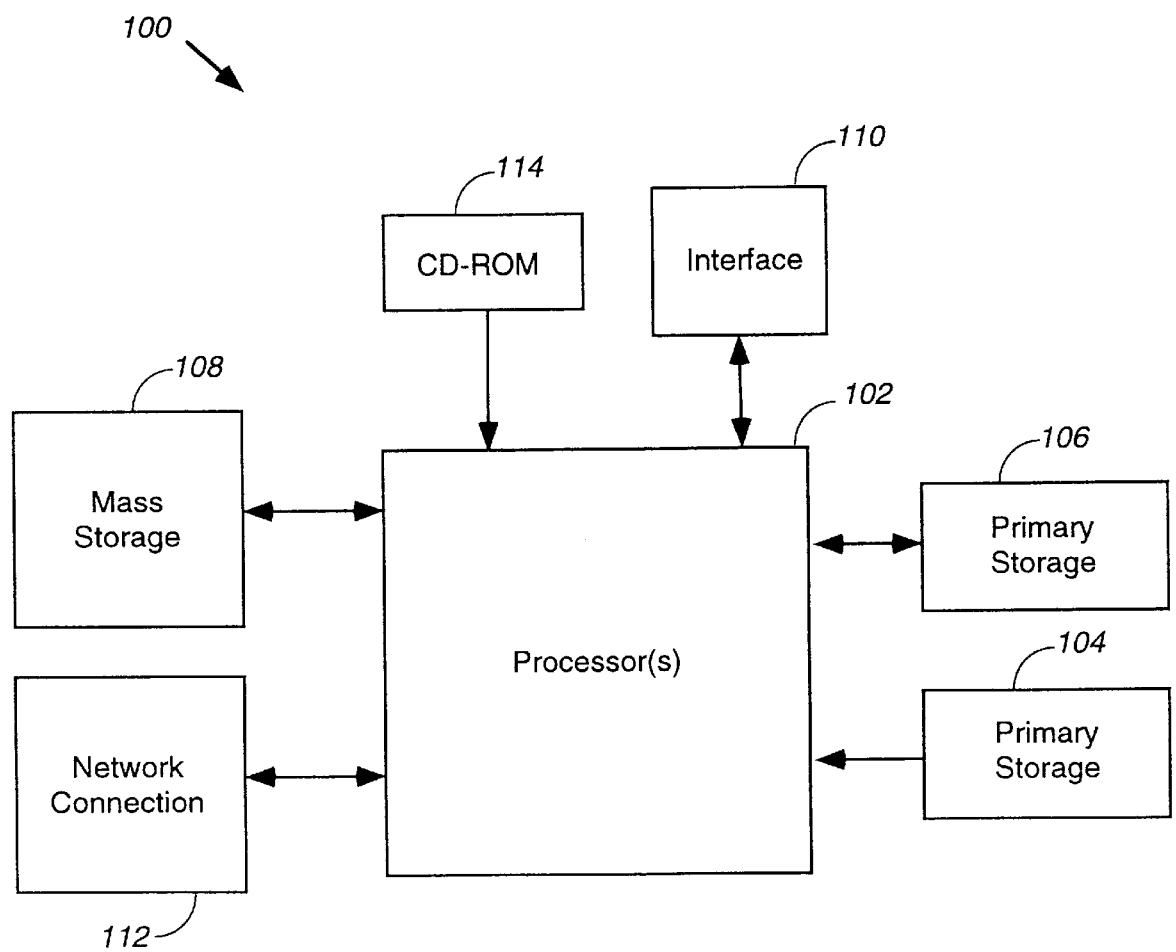
FIG. 16 shows a typical computer system suitable for implementing an embodiment of the present invention.

FIG. 16 illustrates a typical computer system in accordance with an embodiment of the present invention. The computer system 100 includes any number of processors 102 (also referred to as central processing units, or CPUs) that are coupled to storage devices including primary storage 106 (typically a random access memory, or RAM), primary storage 104 (typically a read only memory, or ROM). As is well known in the art, primary storage 104 acts to transfer data and instructions uni-directionally to the CPU and primary storage 106 is used typically to transfer data and instructions in a bi-directional manner. Both of these primary storage devices may include any suitable of the computer-readable media described above. A mass storage device 108 is also coupled bi-directionally to CPU 102 and provides additional data storage capacity and may include any of the computer-readable media described above. The mass storage device 108 may be used to store programs, data and the like and is typically a secondary storage medium such as a hard disk that is slower than primary storage. It will be appreciated that the information retained within the mass storage device 108, may, in appropriate cases, be incorporated in standard fashion as part of primary storage 106 as virtual memory. A specific mass storage device such as a CD-ROM 114 may also pass data uni-directionally to the CPU.

CPU 102 is also coupled to an interface 110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, the fast Booth encoder of the present invention may be used in any application where iterative multiplication is used. Also, the two input numbers may be of any size and the encoder itself may operate in a radix other than radix 4. Additionally, the outputs of the encoder may vary depending upon the method used to generate partial products. Also, any suitable transformation technique may be used to reduce the generated partial products into two rows of information that may be fed into the fast Booth encoder. Therefore, the described embodiments should be taken as illustrative and not restrictive, and the invention should not be limited to the details given herein but should be defined by the following claims and their full scope of equivalents.

We claim:

1. A multiplying apparatus for multiplying a first binary number by a second binary number in an iterative multiplication, said multiplying apparatus comprising:

a fast carry-sum form Booth encoder having as inputs a sum row and a carry row representative of said first binary number and arranged to add said sum row and said carry row using a multiplicity of interconnected logic cells, each logic cell generating a plurality of carry bits to be received by a successive logic cell such that said carry bits are rippled through no more than two of said successive logic cells, each logic cell including a decoder that receives corresponding portions of said sum and carry rows, a pre-Booth encoding unit that receives output from said decoder, a logic gate that receives output from said pre-Booth encoding unit and a first carry-in bit to produce a logic gate output, and a multiplexer that receives said logic gate output and a second carry-in bit to produce a logic cell Booth output, said Booth encoder having a Booth output that is the Booth encoded form of the sum of said sum row and said carry row and is formed from said logic cell Booth output of said logic cells;

a partial product generator arranged to generate partial products from said Booth output and said second binary number; and a compression unit for compressing said generated partial products into a next sum row and a next carry row, such that said next sum row and said next carry row are representative of the result of multiplying said first binary number by said second binary number, said next sum row and next carry row being input to said fast carry-sum form Booth encoder, whereby iterative multiplication may be performed.

2. A multiplying apparatus as recited in claim 1 wherein said fast carry-sum form Booth encoder is a Radix-4 encoder and further comprises:

an additional last logic cell receiving a plurality of fixed inputs and first and second carry bits from a previous one of said interconnected logic cells, said last logic cell having an output generator for producing last cell Booth output associated with said last logic cell.

3. A multiplying apparatus as recited in claim 1 wherein each logic cell of said Booth encoder has an associated logic cell Booth output that depends upon said corresponding portions of said sum and carry rows and upon said plurality of carry bits from a previous interconnected cell.

4. A multiplying apparatus as recited in claim 3 wherein at least one of said plurality of carry bits generated by each logic cell depends only upon said corresponding portions of said sum row and said carry row received by said logic cell.

5. A multiplying apparatus as recited in claim 4 wherein said Booth encoder is a Radix-4 encoder and a first carry bit produced in each logic cell depends upon said corresponding portions of said sum row and said carry row received by said logic cell and upon a second carry bit from said previous interconnected cell, and wherein said second carry bit produced in each logic cell depends upon said corresponding portions of said sum row and said carry row received by said logic cell.

6. A multiplying apparatus as recited in claim 5 wherein said second carry bit produced in each logic cell depends only upon said corresponding portions of said sum row and said carry row received by said logic cell.

7. A multiplying apparatus as recited in claim 1 wherein said compression unit is a Wallace tree compression unit.

8. A computer-implemented method of multiplying a first binary number by a series of binary numbers in an iterative multiplication using a fast carry-sum form Booth encoder, said method comprising:

inputting a sum row and a carry row representative of said first binary number into said fast carry-sum Booth encoder, said fast carry-sum Booth encoder arranged to add said sum row and said carry row using a multiplicity of interconnected logic cells, each logic cell generating a plurality of carry bits to be received by a successive logic cell such that said carry bits are rippled through no more than two of said successive logic cells, each logic cell including a decoder that receives corresponding portions of said sum and carry rows, a pre-Booth encoding unit that receives output from said decoder, a logic gate that receives output from said pre-Booth encoding unit and a first carry-in bit to produce a logic gate output, and a multiplexer that receives said logic gate output and a second carry-in bit to produce a logic cell Booth output, said fast carry-sum Booth encoder producing a Booth output that is the Booth encoded form of the sum of said sum row and said carry row and is formed from said logic cell Booth output of said logic cells;

generating partial products from said Booth output and one of said series of binary numbers;

compressing said partial products into a next sum row and a next carry row, said next sum row and said next carry row representing the product of said Booth output and one of said series of binary numbers; and recursively inputting said next sum row and said next carry row into said fast Booth encoder such that said next sum row and said next carry row are multiplied by a next one of said series of binary numbers, whereby said method operates to produce the product of said first binary number and said series of binary numbers.

9. A method as recited in claim 8 wherein each logic cell of said Booth encoder has an associated logic cell Booth output that depends upon said corresponding portions of said sum row and said carry row received by said logic cell and upon said plurality of carry bits from a previous interconnected cell.

10. A method as recited in claim 9 wherein at least one of said plurality of carry bits generated by each logic cell depends only upon said corresponding portions of said sum row and said carry row received by said logic cell.

11. A method as recited in claim 10 wherein said Booth encoder is a Radix-4 encoder and a first carry bit produced in each logic cell depends upon said corresponding portions of said sum row and said carry row received by said logic cell and upon a second carry bit from said previous interconnected cell, and wherein said second carry bit produced in each logic cell depends upon said corresponding portions of said sum row and said carry row received by said logic cell.

12. A method as recited in claim 11 wherein said second carry bit produced in each logic cell depends only upon said corresponding portions of said sum row and said carry row received by said logic cell.

* * * * *